Patented Nov. 6, 1928.

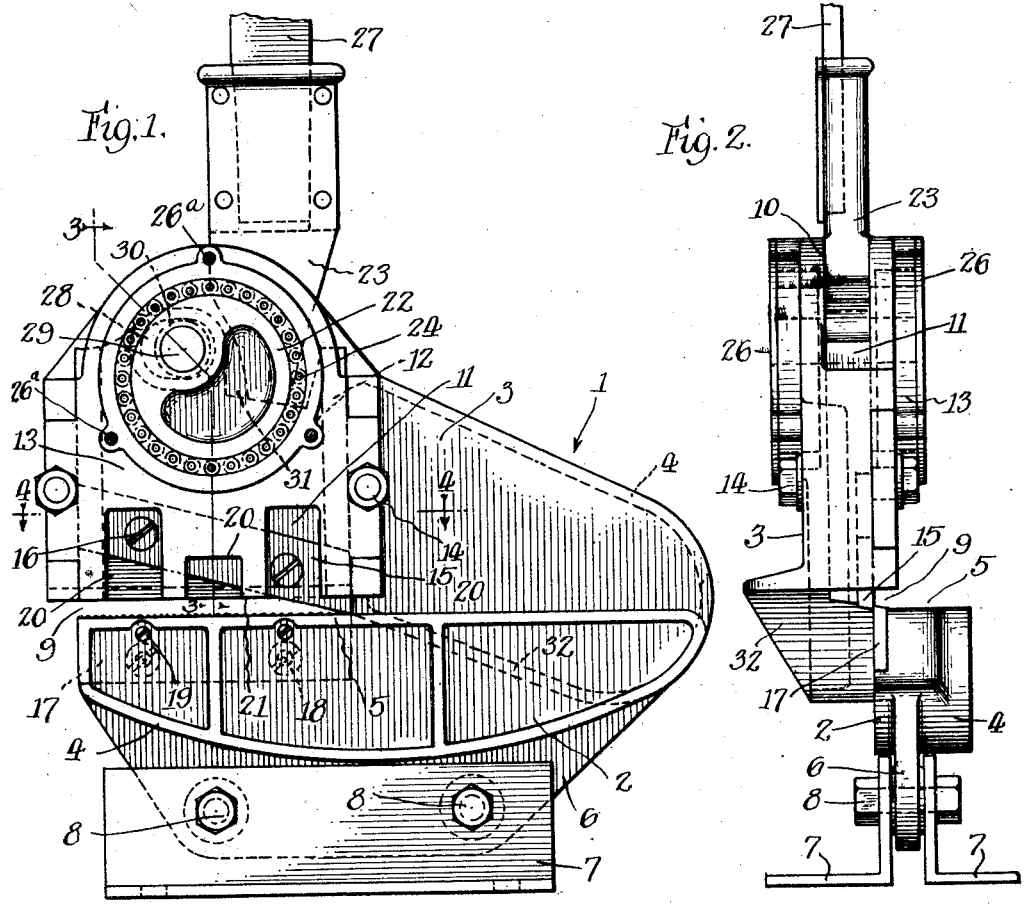

1,690,303

UNITED STATES PATENT OFFICE.

JOHN JENSEN, OF ROCKFORD, ILLINOIS, ASSIGNOR TO WHITNEY METAL TOOL COMPANY, OF ROCKFORD, ILLINOIS, A CORPORATION OF ILLINOIS.

METAL SHEARS.

Application filed September 17, 1927. Serial No. 220,079

The invention relates to metal-shears and particularly to hand operated shears.

One object is to provide means for positioning bent shapes of material, such as an angle bar, in relation to the shears to permit cutting the legs or flanges thereof.

A further object is to provide a structure for supporting and operating the shear blades which is rigid against strain, compact in form and durable in operation.

Other objects and advantages will be apparent in the following description of a prefered embodiment of the invention which is illustrated in the accompanying drawings.

In the drawings Figure 1 represents a side elevation of the shears and Fig. 2 represents a front end elevation.

Fig. 3 is a fractional, cross sectional view taken in elevation on the planes of the line 3—3 in Figure 1.

Fig. 4 is a sectional plan view taken on the plane of the line 4—4 in Figure 1.

In the drawings the numeral 1 indicates a preferably integral frame structure, having a lower portion 2 and an upper portion 3, the latter being vertically offset from the lower portion. The frame structure may be provided with re-enforcing ribs, indicated at 4, of which one forms a horizontal table 5 on the lower portion 2 of the structure, and extending along the line of offset between the two portions.

The frame structure is preferably provided with a web or flange 6 extending downwardly from the lower portion 2, to which may be secured a pair of angle bars 7, as by bolts 8 or other suitable means, the angle bars forming a pedestal for the support of the shears. The angle bars may be secured, if desired, to a table or other stationary support.

The front portion of the frame structure is provided with a slot 9 extending substantially inward of the structure and positioned along the line of offset between the upper and lower portions of the frame, the table 5 forming the lower margin of the slot. The slot 9 is of suitable width to admit material to be cut by the shears to the limit of thickness for which the shears are adapted.

The front portion of the upper portion 3 of the frame is provided with a vertically disposed recess 10 extending to the slot 9 to accommodate a reciprocatory blade holder 11 positioned therein. The blade holder 11 is laterally supported in suitable slide-ways 12 formed in the lateral margins of the recess 10. The holder 11 is retained in the recess 10 by means of a removable plate 13 suitably secured to the frame, preferably by means of bolts 14.

The lower margin of the holder 11 is preferably formed in angular relation to the slot 9 and is provided with a cutting blade 15 suitably secured to the holder as by means of screws 16. The cutting blade 15 is cooperatively associated with a second cutting blade 17 secured to the lower portion 2 of the frame with its cutting edge extending into the slot 9 slightly above the table 5. The second or lower blade 17 is preferably secured to the frame by means of a pair of screws 18, and adjustment of the blade 17 in relation to the upper blade 15 may be accomplished by means of a pair of adjusting set screws 19, mounted in the frame structure and engaging the blade 17 above the supporting screws 18. The counter-action of the supporting screws and the adjusting screws effect the rigid positioning of the blade 17 in proper shearing relation to the upper blade 15 and may be adjusted to compensate for wear in the blades.

The retaining plate 13 is provided at its lower margin with a pair of upwardly extending recesses 20, exposing the lateral face of the upper blade 15 and permitting the introduction of bent shapes of metal stock to be cut. The recesses 20 are particularly adapted for the angular cutting of one leg of an angle iron bar at any angle to the other leg which may be desired, the other leg of the bar being positioned within one of the recesses 20 in abutment with the upper blade 15 so that the cut is made precisely at the end of the bar. This provision for the angular cutting of either or both legs of one end of an angle bar is especially advantageous in cutting such bars for corner joints in structures in which the bars are used, as illustrated in Fig. 4 wherein A represents an angle bar.

The retaining plate 13 is provided with guide tongue portions 21 formed between the recesses 20 and extending to the upper margin of the slot 9, by which is prevented the insertion between the blades of material stock of greater thickness than the designed cutting capacity of the shears.

The reciprocatory movement of the blade holder 11, by which the shearing operation is effected, is accomplished by means of a rotatable member operatively supported by the upper portion of the frame and the retaining plate, and having an eccentric connection with the holder 11. The rotatable operating member comprises a pair of laterally spaced concentric plates 22 having cylindrical, marginal contour and joined by means of a handle support 23 extending partially between the plates 22 and preferably of integral construction with those plates.

The cylindrical plates 22 are respectively supported in bearings provided in the upper portion 3 of the frame and in the retaining plate 13, the space between the cylindrical plates being alined with the recess 10 within which is supported the blade holder 11. The bearings provided for the cylindrical plates 22 are preferably of the anti-friction type and comprise respectively a series of rollers 24 supported in a suitable bearing channel in the frame structure and the retaining plate. The rollers 24 are retained in operative position by means of conventional retaining rings 25, and suitable lateral covers 26 are respectively secured to the frame structure and the retaining plate as by means of screws 26ª. In Figure 1 the front cover 26 has been removed. Manual rotation of the cylindrical plates 22 with their integral handle support 23 is preferably effected by means of the removable handle bar 27 positioned in a socket provided in the handle support.

The blade holder 11 extends at its upper end between the cylindrical plates 22, and is provided with a horizontally elongated bearing recess 28 through which extends a pin 29 rigidly supported at its ends in the cylindrical plates 22, the axis of the pin 29 being positioned in eccentric relation to the axis of the cylindrical plates. The pin 29 carries a bearing sleeve 30 positioned in and in operable contact with the bearing recess 28 formed in the blade holder. The sleeve 30 functions as an anti-friction roller between the pin 29 and the bearing surfaces of the holder 11 about the recess 28.

The upper end of the blade holder 11 is preferably provided with an end pocket 31 positioned rearwardly of the bearing recess 28 and adapted to accommodate the portion of the handle support 23 extending between the cylindrical plates 22 when the bearing support is rotated to lift the blade holder.

The short radius of the eccentrically positioned pin 29 with its anti-friction roller 30 effects a powerful and durable means for actuating the blade holder 11 in the cutting operation of the shears. The anti-friction roller bearing support for the cylindrical plates 22 further largely contribute to an exceptionally easy operation of the cutting blades which is essential in the satisfactory performance of a manually operated metal-shears.

In operation, the handle is rotated to upright position as illustrated in Figure 1 which lifts the blade holder and its supported upper blade for the introduction of the material in the slot 9. The cutting operation is effected by the forward and downward rotation of the handle, thereby forcing down the upper cutting blade to effect the shearing of the stock. In the case of progressive cuts on sheet material one portion may advance along the upper side of the table 5 and the other sheared portion advance beneath the rib 32 on the opposite side of the offset frame structure.

I claim as my invention:

1. In metal shears, the combination of a stationary blade, a movable blade, and a plate positioned in substantially parallel spaced relation to said stationary blade to limit the dimension of material to be interposed between said blades for cutting, said plate having a recess adapted to admit one portion of a bent piece of material in order to position another portion of said piece of material between said blades for cutting closely proximate to said portion admitted to said recess.

2. In metal shears, the combination of a frame having a material limiting slot formed therein, a stationary blade supported at one margin of said slot, a movable blade supported for operation across the opposite margin of said slot in cutting association with said stationary blade, and a plate supported with a marginal edge adjacent said slot, said plate having a recess extending from said slot adjacent the path of movement of said movable blade.

In testimony whereof, I have hereunto affixed my signature.

JOHN JENSEN.